United States Patent
Dudar et al.

(10) Patent No.: US 9,163,571 B2
(45) Date of Patent: Oct. 20, 2015

(54) METHOD FOR PURGING OF AIR INTAKE SYSTEM HYDROCARBON TRAP

(71) Applicant: Ford Global Technologies, LLC, Dearborn, MI (US)

(72) Inventors: Aed M. Dudar, Canton, MI (US); Dennis Seung-Man Yang, Canton, MI (US); Timothy Watkins, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 14/068,848

(22) Filed: Oct. 31, 2013

(65) Prior Publication Data

US 2015/0120108 A1 Apr. 30, 2015

(51) Int. Cl.
*B60L 11/00* (2006.01)
*F02D 41/00* (2006.01)
*B60W 20/00* (2006.01)
*B60W 10/06* (2006.01)
*B60W 10/08* (2006.01)
*F02D 11/10* (2006.01)
*F02M 25/08* (2006.01)
*F02D 41/04* (2006.01)
(Continued)

(52) U.S. Cl.
CPC ........... *F02D 41/0032* (2013.01); *B60W 10/06* (2013.01); *B60W 10/08* (2013.01); *B60W 20/00* (2013.01); *F02D 11/10* (2013.01); *F02M 25/089* (2013.01); *F02D 13/0215* (2013.01); *F02D 29/02* (2013.01); *F02D 41/042* (2013.01); *Y10S 903/93* (2013.01)

(58) Field of Classification Search
CPC . F02M 25/0854; F02M 25/089; F02M 25/08; F02M 25/0809; Y10S 903/905; F02D 41/042; F02D 41/0032
USPC ................ 701/22, 54, 93; 123/518, 519, 520; 180/65.21, 65.28; 903/902
See application file for complete search history.

(56) References Cited

U.S. PATENT DOCUMENTS

| 6,421,599 B1 * | 7/2002 | Lippa et al. .................... 701/102 |
| 7,059,306 B2 | 6/2006 | Reddy |
| 7,110,904 B2 * | 9/2006 | Lippa et al. .................... 702/102 |

(Continued)

FOREIGN PATENT DOCUMENTS

| JP | 2009024613 A | 2/2009 |
| JP | 2009085036 A | 4/2009 |

(Continued)

OTHER PUBLICATIONS

Pearce, Russell Randall et al., "Air Intake System Hydrocarbon Trap Purging," U.S. Appl. No. 13/874,225, filed Apr. 30, 2013, 37 pages.

*Primary Examiner* — Gertrude Arthur Jeanglaude
(74) *Attorney, Agent, or Firm* — James Dottavio; Alleman Hall McCoy Russell & Tuttle LLP (57) ABSTRACT

Methods and systems are provided for improving air intake system hydrocarbon trap purging during engine-off time in a hybrid electric vehicle. One method includes opening the throttle during vehicle motion under battery operation and allowing airflow through the trap to purge its contents into the fuel canister via the canister purge valve. Upon transition into the engine-on mode, fuel vapors are released from the canister into the engine intake.

19 Claims, 7 Drawing Sheets (51) Int. Cl.
    *F02D 13/02*     (2006.01)
    *F02D 29/02*     (2006.01)

(56) References Cited

U.S. PATENT DOCUMENTS

| | | | |
|---|---|---|---|
| 7,225,796 B2 | 6/2007 | Reddy et al. | |
| 7,556,026 B2 | 7/2009 | Herald et al. | |
| 8,112,985 B2 * | 2/2012 | Uhrich et al. | 60/284 |
| 8,443,787 B2 | 5/2013 | Schondorf et al. | |
| 2006/0054142 A1 | 3/2006 | Burke et al. | |
| 2009/0084363 A1 | 4/2009 | Reddy | |
| 2013/0228145 A1 | 9/2013 | Moyer et al. | |

FOREIGN PATENT DOCUMENTS

| | | |
|---|---|---|
| JP | 2010158927 A | 7/2010 |
| JP | 5185059 B2 | 4/2013 |

\* cited by examiner

METHOD FOR PURGING OF AIR INTAKE SYSTEM HYDROCARBON TRAP

FIELD

The present description relates to a hydrocarbon trap in an intake system of an engine of a hybrid vehicle.

BACKGROUND AND SUMMARY

Plug-in hybrid electric vehicles (PHEV) may include hydrocarbon (HC) traps coupled in an air induction system of the engine to adsorb evaporative emissions in the engine intake. For example, fuel vapors may result from fuel sprayed into the intake manifold, fuel leaked from fuel injectors and/or fuel puddled in the intake. These fuel vapors, if not stored in the hydrocarbon trap, may flow out of the intake system during engine shutdown, increasing evaporative emissions.

Example hydrocarbon traps are shown by Moyer et al in US 2013/0228145 and Burke et al. in US 2006/0054142. The hydrocarbon traps are positioned in the intake system so that fuel vapors can be passively adsorbed in and released from the hydrocarbon trap. Specifically, during engine operation, intake manifold vacuum draws the fuel vapors into the engine and also causes airflow across the trap, increasing desorption. Desorbed vapors are subsequently combusted in the engine.

However the inventors herein have identified potential issues with such systems. The reduced engine operation time of PHEVs may limit the amount of intake manifold vacuum generated for hydrocarbon trap purging. As such, airflow across the trap may be limited, reducing passive desorption of fuel vapors. Incomplete purging of the hydrocarbon trap can result in an increase in intake evaporative emissions and degrade vehicle emissions performance.

The inventors herein have recognized the above issue and identified an approach to at least partly address the issue. In one example approach, a method for a hybrid vehicle with an engine including a HC trap in an intake of the engine is provided. The method comprises, during vehicle travel in an engine-off condition, increasing airflow through a HC trap and purging fuel vapors from the trap to a fuel system canister coupled to a fuel tank. In this way, a HC trap can be at least partially purged in an efficient way, even during conditions when the engine is not running.

For example, while operating the hybrid vehicle in an electric mode where wheel torque is provided by a system battery and an engine is maintained shutdown (e.g., at rest), HC trap purging may be enabled when there is sufficient vehicle motion-induced airflow. For example, once the vehicle speed exceeds a threshold, the intake throttle may be partially or fully opened to increase airflow through the intake system and past the HC trap. Concurrently, cylinder intake and exhaust valves may be closed (e.g., via cam timing adjustments), if not already closed, and a canister purge valve may be opened so as to route motion-inducted airflow containing released HCs from the HC trap to the fuel system. The purge fuel vapors desorbed from the HC trap can be routed into and through a fuel system canister so as to transport the stored HCs from the intake system to be stored in the fuel system. Intake airflow may also be further enhanced during the engine-off condition via adjustments to grill shutters and louvers, as well as by operating a cooling system fan.

In this way, intake fuel vapors stored in an air induction system HC trap may be opportunistically transferred to a fuel system canister with larger storage capacity for storage therein during engine-off conditions. By opening an intake throttle during vehicle travel in an electric mode, vehicle motion is advantageously used to generate airflow in a direction from ambient, to and along the hydrocarbon trap, and then to another storage location before finally venting to atmosphere. This enables the trap to be at least partially cleaned even while an engine is shutdown and no intake manifold vacuum is generated. By delivering the fuel vapors from the smaller capacity trap to a larger capacity fuel system canister, the canister may be used as a HC vapor "storage bank" so that the HC trap may be cleaned out more often until the engine is operated to clean out the canister (and the HC trap). This results in reduced HC breakthrough from the HC trap. Overall exhaust emissions and hybrid vehicle performance are thereby improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
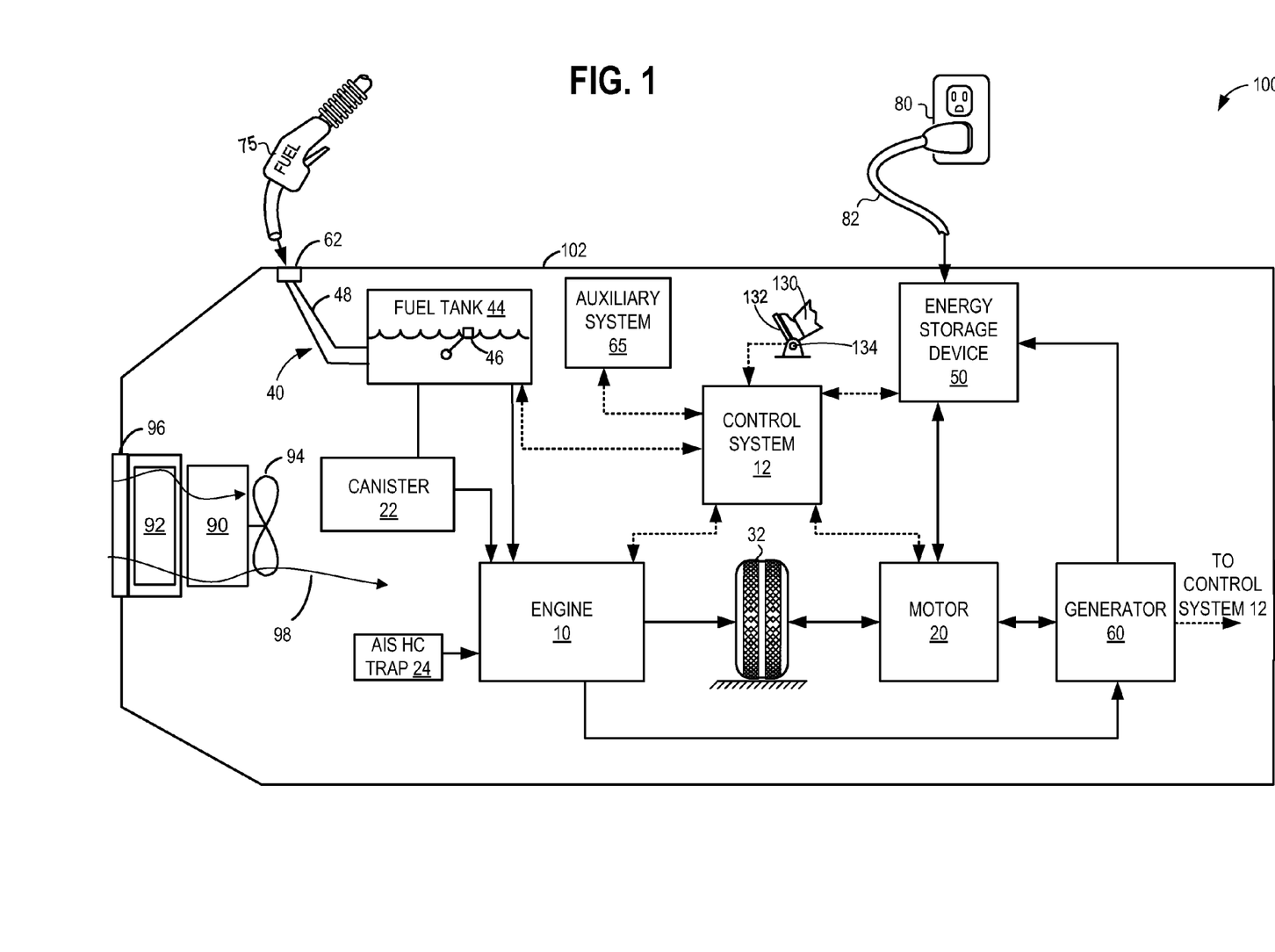
FIG. 1 shows an example hybrid vehicle system layout.
Figure 2:
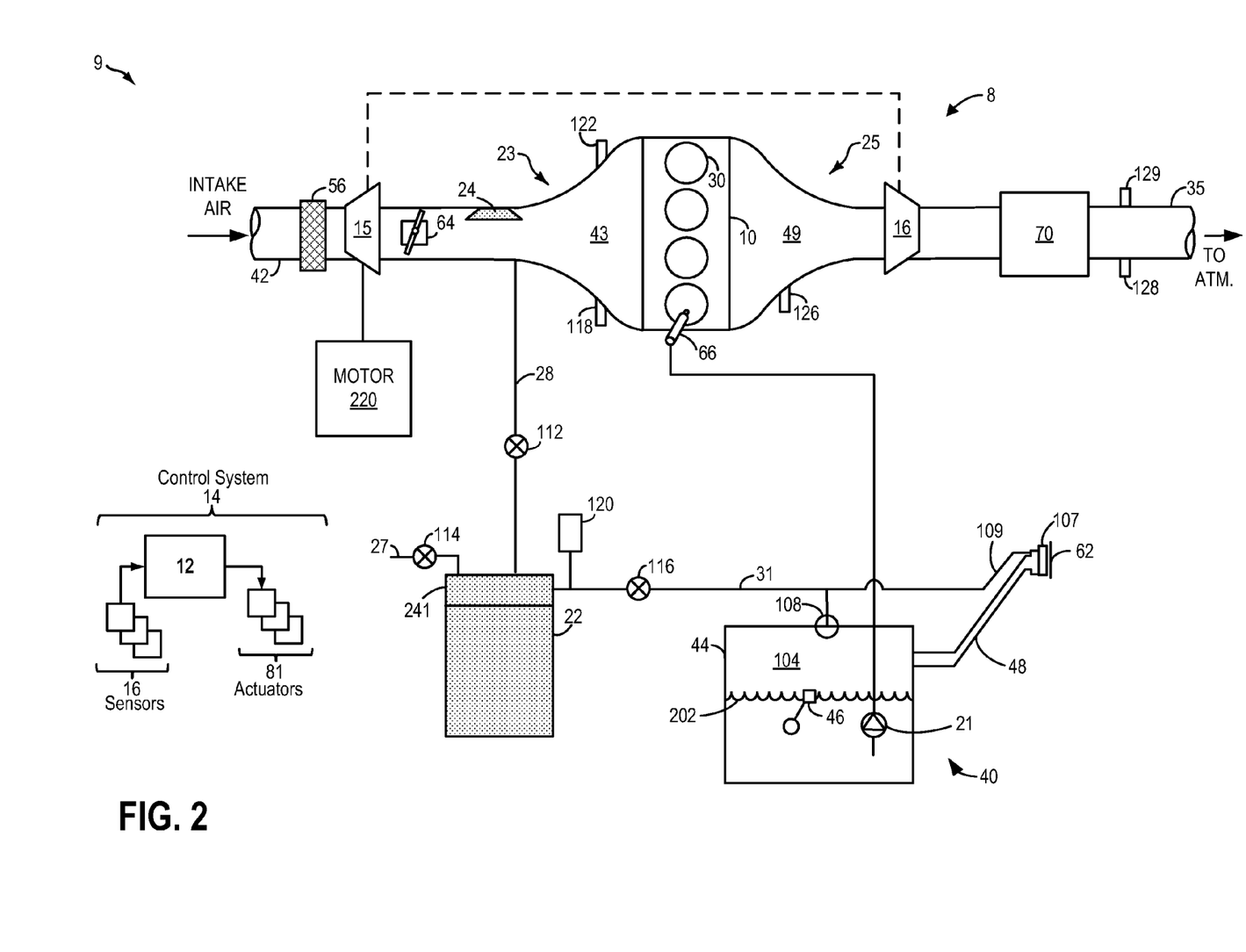
FIG. 2 depicts an example embodiment of an engine system, including a fuel system, coupled in the vehicle system of FIG. 1.
Figure 3:
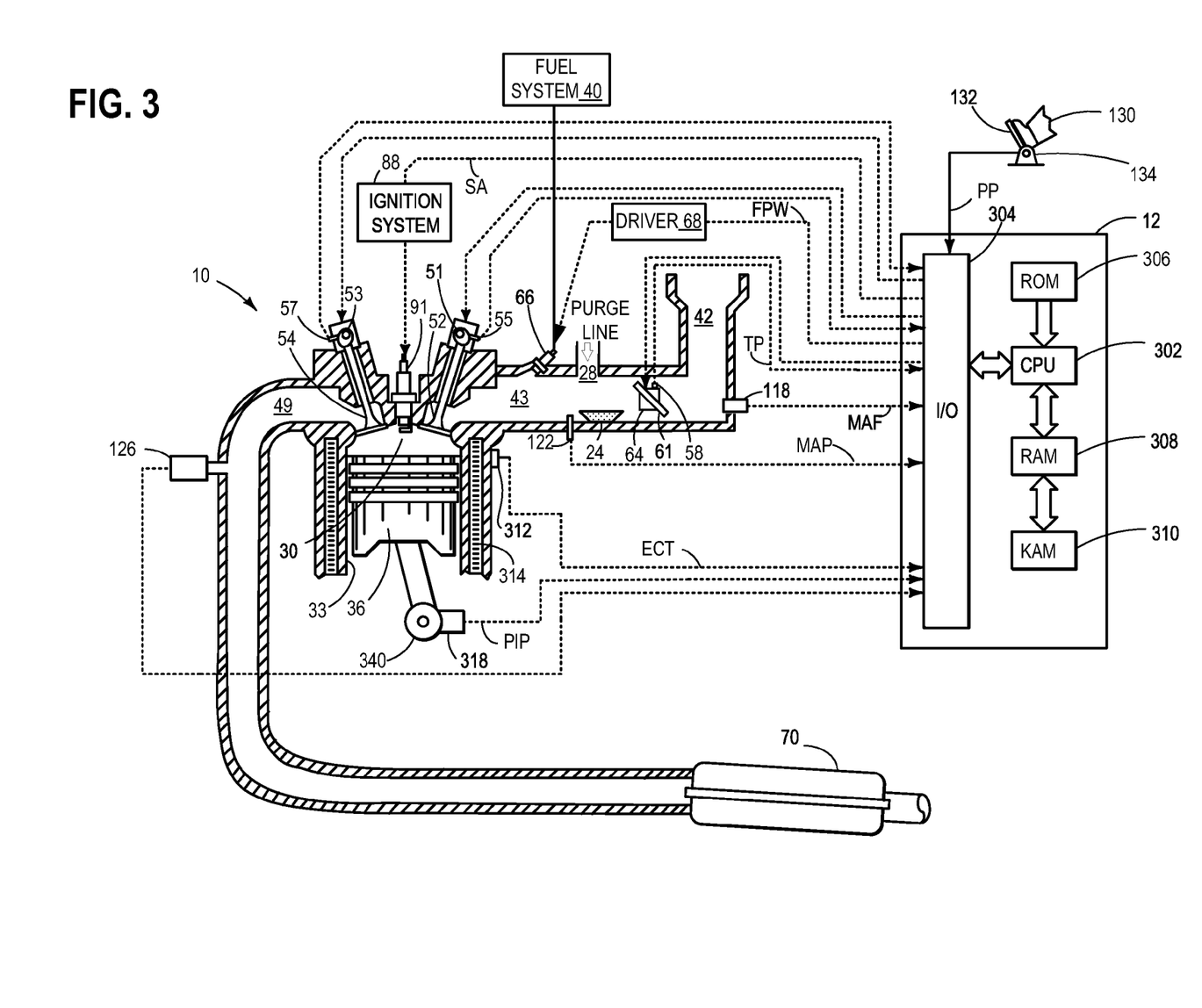
FIG. 3 shows a schematic depiction of an engine.
Figure 6:
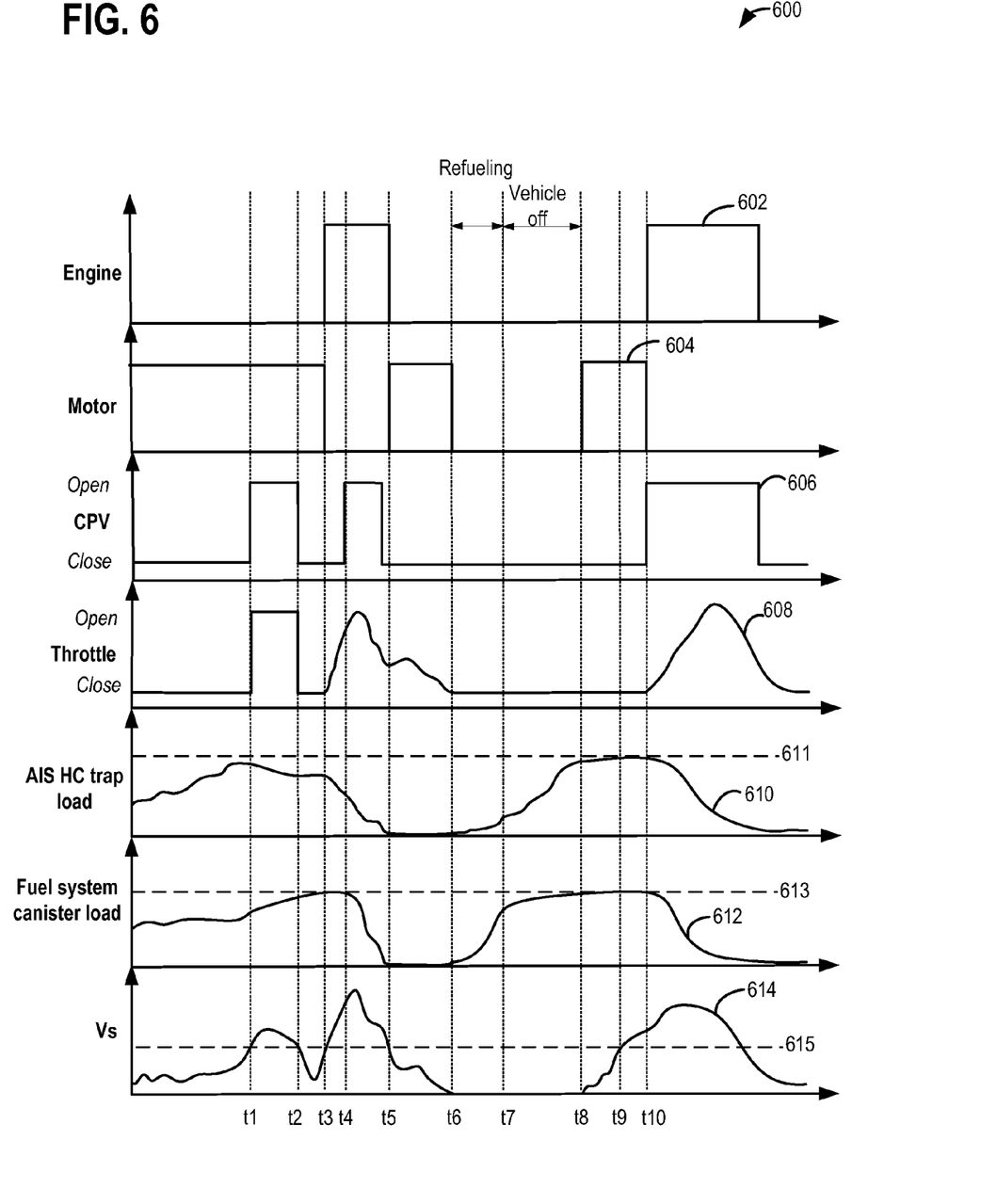
FIG. 6 illustrates an example purging of an AIS HC trap and a fuel system canister, according to the present disclosure.
Figure 7:
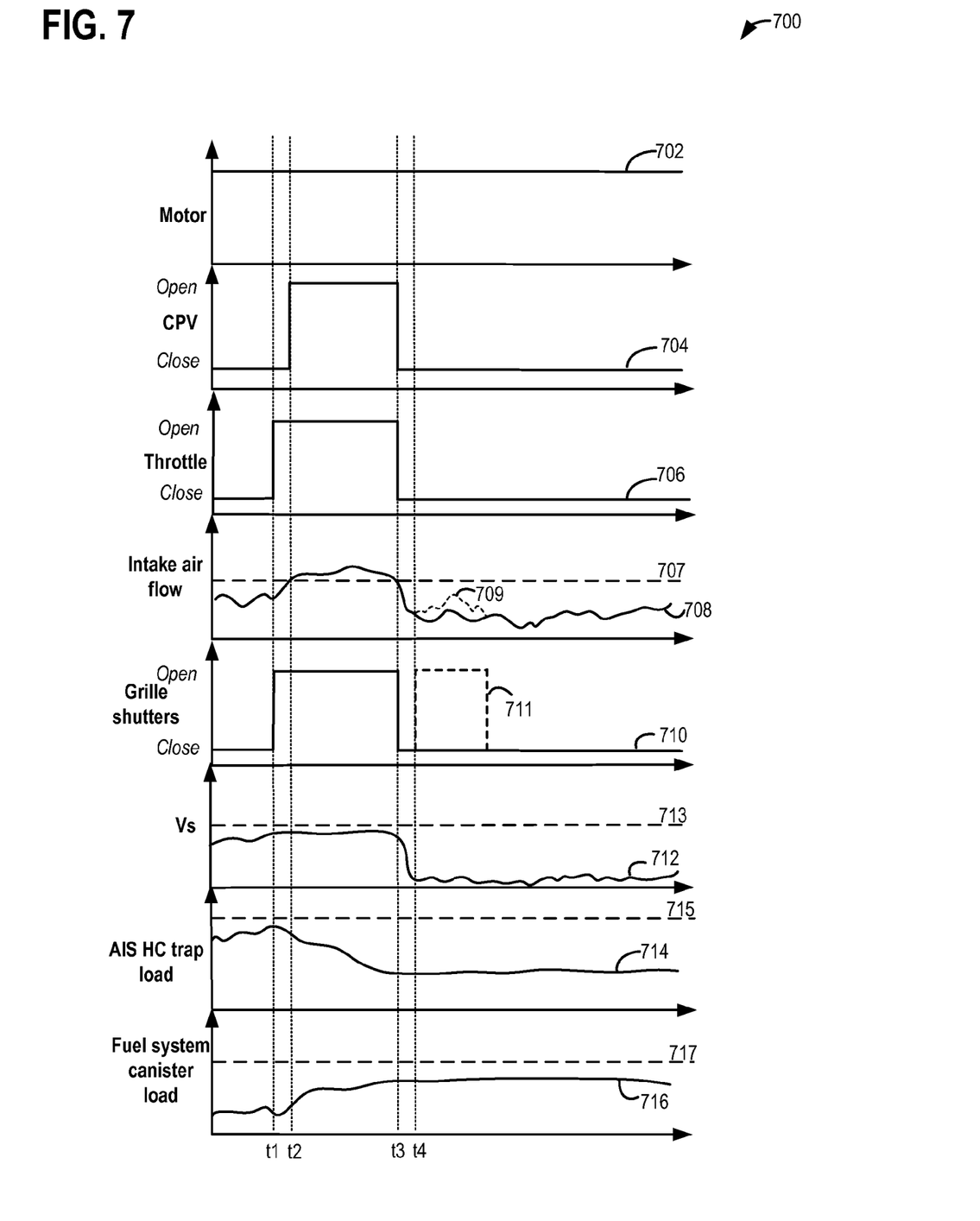
FIG. 7 demonstrates an example purging of an AIS HC trap with grille shutter assistance.

The following description relates to systems and methods for improving purging of a hydrocarbon (HC) trap situated in an engine intake, such as in the plug-in hybrid electric vehicle system of FIGS. 1 and 2. The HC trap is located within the air intake system (AIS) of an engine system, downstream of an intake throttle and upstream of the cylinders, as shown in FIG. 3. A controller may be configured to perform a routine, such as the example routine of FIG. 4, to open an intake throttle and canister purge valve (CPV), while closing cylinder valves (if not already closed) during vehicle travel in an electric-only mode to generate an airflow in the direction of the HC trap, allowing for improved desorption of fuel vapors from the HC trap. The controller can also perform a routine, such as that of FIG. 5, to purge the fuel system canister when the engine is operational. The CPV may be opened based on various vehicle operating conditions to expedite transfer of fuel vapors from the HC trap into the fuel system canister (FIGS. 6 and 7). In this way, an AIS HC trap may be cleaned out opportunistically, without degrading hybrid vehicle performance.

FIG. 1 is a schematic depiction of an example vehicle propulsion system 100 in a motor vehicle 102. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, the propulsion system 100 depicted herein is a plug-in hybrid electric vehicle (PHEV). PHEVs are also classified as partial zero emissions vehicles (PZEVs) due to their substantially reduced exhaust emissions.

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60, may instead receive wheel torque from drive wheel 32 and convert the kinetic energy of the vehicle to electrical energy for storage at energy storage device 50. Energy storage device 50 may be, for example, a system battery or set of batteries.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

A cooling fan 94 may be coupled to radiator 90 in order to maintain airflow through radiator 90 and cool the engine. In some examples, fan speed may be controlled by a controller 12 or may be coupled to the engine accessory drive system, driven by the engine crankshaft. Motor vehicle 102 further includes a grille 96 providing an opening (e.g., a grille opening, a bumper opening, etc.) for receiving airflow 98 through or near the front end of the vehicle and into the engine compartment. Such airflow 98 may then be utilized by radiator 90 and other components to keep the engine and/or transmission cool. Grille shutters 92 may be configured to adjust the amount of airflow received through grille 96. Grille shutters 92 may cover a front region of the vehicle spanning from just below the hood to the bottom of the bumper, for example. Electric fan operation may be coordinated with grille shutter operation for a vehicle engine system to increase engine cooling and optimize vehicle fuel economy. Opening the grille shutters and increasing the rotation speed of the electric fan increases airflow through the vehicle front end, supplying cooling airflow to a radiator. As elaborated herein with reference to FIG. 4, during selected conditions, while the vehicle is propelled via motor 20, adjustments to grille shutters 92 and cooling fan 94 may also be used to increase airflow into the air induction system of engine 10 to improve purging of a hydrocarbon (HC) trap 24 coupled therein. An air intake system hydrocarbon trap (AIS HC) 24 may be placed in the intake manifold of engine 10 to adsorb fuel vapors generated within the intake (e.g., during engine running or after the engine is shutdown). The AIS HC trap functionality will be elaborated further in the description of FIG. 2.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 which may comprise a float connected to a variable resistor for sending a signal regarding a fuel level in the tank to controller 12. The level of fuel stored at fuel tank 44 (e.g. as identified by the fuel level sensor) may be communicated to the vehicle operator, for example, via a fuel gauge or indication lamp (not shown) on a dashboard of the vehicle system.

Vehicle propulsion system 100 may include a fuel door 62 located on an outer body of the vehicle for receiving fuel from an external fuel source. Fuel door 62 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events. During fuel tank refilling, fuel may be pumped into the fuel tank from fuel dispensing device 75 via a refueling line 48 that forms a passageway from fuel door 62.

Fuel vapors generated in fuel tank 44 due to diurnal events and refueling events may be directed to and stored in canister 22. The canister may include an adsorbent for storing the received fuel vapors. During selected engine operating conditions, fuel vapors may be desorbed from the canister and released into an engine intake for purging.

Vehicle propulsion system 100 may include an auxiliary system 65. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the controller 12 of the vehicle and a global positioning satellite via wireless communication.

Controller 12 may communicate with one or more of engine 10, motor 20, fuel system 40, energy storage device 50, and generator 60. Specifically, controller 12 may receive feedback from one or more of engine 10, motor 20, fuel system 40, energy storage device 50, and generator 60 and send control signals to one or more of them in response. Controller 12 may also receive an indication of an operator requested output of the vehicle propulsion system from a vehicle operator 130. For example, controller 12 may receive feedback from pedal position sensor 134 which communicates with accelerator pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50.

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

FIG. 2 shows a schematic depiction of an engine system 8 coupled in a hybrid vehicle system 9. In one example, hybrid vehicle system 9 is configured as vehicle propulsion system 100 of FIG. 1. As such, vehicle and engine components previously introduced in FIG. 1 are numbered similarly in FIG. 2 and not reintroduced.

Engine system 8 may include an engine 10 (such as engine 10 of FIG. 1) having a plurality of cylinders 30. Engine 10 includes an engine intake 23 and an engine exhaust 25. Engine intake 23 includes an air intake throttle 64 fluidly coupled to the engine intake manifold 43 via an intake passage 42. Air may enter intake passage 42 via air filter 56. Air intake passage may also include a hydrocarbon (HC) trap 24 (herein also referred to as air intake system hydrocarbon trap 24 or AIS HC trap 24) placed downstream of the throttle 64 and upstream of the cylinders.

The HC trap 24 is configured to adsorb fuel vapors emanating from unburned fuel in the intake manifold, puddled fuel from leaky injectors and/or fuel vapors in crankcase ventilation emissions during engine-off periods. The HC trap may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials.

The HC trap 24 may be shaped and sized to provide the least obstruction to the flow of air into the intake passage. Thus, the HC trap may be thinner and of a smaller size and capacity than the fuel system canister coupled to the fuel tank (such as canister 22 of FIG. 2). When the engine is operational causing an intake manifold vacuum and a resulting airflow across the HC trap, the trapped vapors are passively desorbed from the HC trap and combusted in the engine. Thus, during engine operation, intake fuel vapors are stored and desorbed from HC trap 24. In addition, fuel vapors stored during an engine shutdown can also be desorbed from the HC trap during engine operation. In this way, AIS HC trap 24 may be continually loaded and purged, and the trap may reduce evaporative emissions from the intake passage even when engine 10 is shut down.

However, in a PHEV, opportunities to clean out the HC trap via passive desorption (e.g., using airflow created by an intake vacuum) are limited because of the reduced engine operation time. For example, the engine may be selectively activated at high cruising speeds on the highway. As will be elaborated in FIG. 4, the AIS HC trap may be purged during vehicle motion under battery operation by enabling airflow through the intake and consequently, the trap. The fuel vapors in the HC trap are then purged into the fuel system canister through the canister purge valve. This allows trap purging even during engine shutdown conditions.

Figure 4:
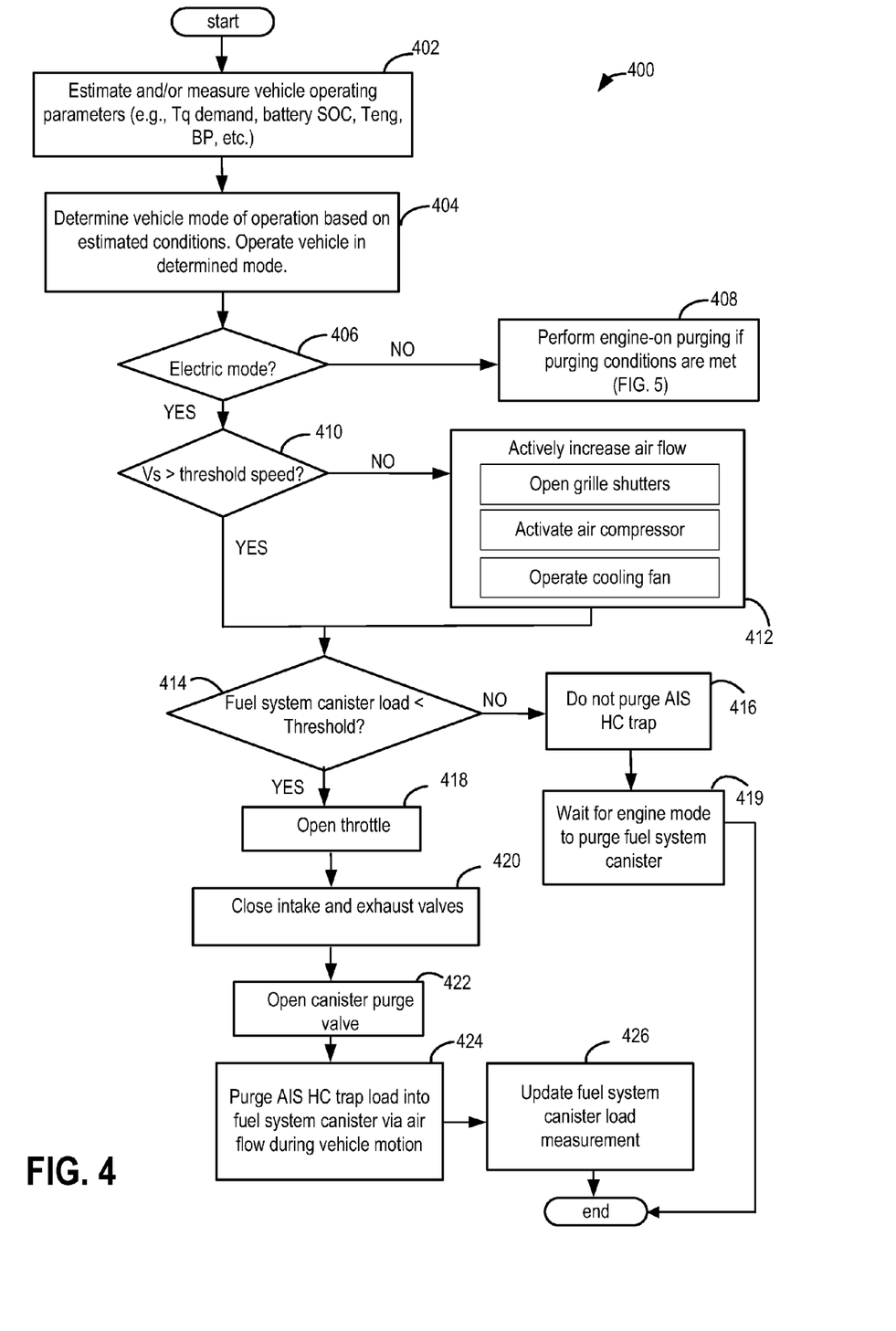
FIG. 4 is an example flowchart illustrating a method of purging an air intake system HC trap during an engine-off mode.

In some examples, an amount of fuel vapor stored in HC trap 24 may be determined by one or more sensors (e.g., fuel sensors, air-fuel ratio sensors, pressure sensors, etc.) coupled to the HC trap and/or in an intake of the engine. As another example, the amount of fuel vapors stored in the HC trap may be based on a cumulative engine run-time. For example, if the engine has been operated for an amount of time greater than a threshold time, then it may be inferred that the amount of vapor stored in the HC trap is greater than a threshold. In the example of FIG. 4, cleaning of the HC trap may be performed via passive desorption during engine operation or via an induced intake airflow during engine shutdown conditions. The HC trap may also be purged without waiting for the trap load level to surpass a threshold. When the vehicle speed is high enough to permit sufficient airflow through the trap and when the fuel system canister has reserve to accept more HC vapors, the HC trap may be opportunistically purged. However, in alternate examples, purging of the HC trap may be scheduled based on the trap load.

In still further examples, during engine-off conditions a controller may periodically "wake-up" to determine HC trap load. For example, an amount of fuel vapors stored in the HC trap may be determined just prior to or during a key-off event to determine if the HC trap is to be purged following the key-off event while the engine is not in operation.

Engine exhaust 25 includes an exhaust manifold 49 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

Engine system 8 being a boosted engine system includes a turbocharger having an intake compressor 15 and an exhaust turbine 17. Compressor 15 may be driven by the rotation of turbine 17. In some embodiments, compressor 15 may be coupled to a motor 220 and may be driven by the operation of motor 220, thereby also providing an electric compressor (or e-compressor) mode of compressor operation. Motor 220 may be a dedicated motor, or motor 20 of FIG. 1. Motor 220 may draw power from an on-board energy storage device, such as battery 50.

Engine system 8 is coupled to fuel system 40. Fuel system 40 includes a fuel tank 44 coupled to a fuel pump 21 and a fuel system canister 22. Fuel tank 44 receives fuel via a refueling line 48, which acts as a passageway between the fuel tank 44 and a fuel door 62 on an outer body of the vehicle. During a fuel tank refueling event, fuel may be pumped into the vehicle from an external source through refueling inlet 107 which is normally covered by a gas cap. During a refueling event, while fuel is pumped into fuel tank 44, one or more fuel tank vent valves may be opened to allow refueling vapors to be directed to, and stored in, canister 22.

Fuel pump 21 is configured to pressurize fuel delivered to the injectors of engine 10, such as example injector 66. While only a single injector 66 is shown, additional injectors are provided for each cylinder. It will be appreciated that fuel system 40 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest.

During engine shutdown, the engine may be spun to, and shutdown in, a selected position that improves engine restart. For example, one of the cylinders may be positioned such that it is in a compression stroke. Thus, when the controller determines that an engine restart is imminent, fuel is injected into this cylinder and the air and fuel mixture is ignited to provide immediate response. However, this position may not be advantageous when the HC trap contents need to be transferred into the fuel system canister. Specifically, during vehicle propulsion under engine-off conditions, when the throttle is opened to allow airflow into the intake manifold to purge the HC trap via an open canister purge valve, an engine position with open intake valves may draw a portion of the vapors into the engine. As elaborated at FIG. 4, during conditions when a HC trap is being purged during vehicle travel in an electric mode, an engine position may be adjusted (e.g., via starter motor/generator operation) to a position that reduces fuel vapor ingestion (e.g., to a position where cylinder valves are closed). Then, when the purging is completed, the engine may be readjusted to a position that improves engine restartability.

Vapors generated in fuel tank 44 may be routed to fuel system canister 22, via conduit 31, before being purged to engine intake 23. Fuel tank 44 may include one or more vent valves for venting diurnals and refueling vapors generated in the fuel tank to fuel system canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism which, when displaced by fuel, shuts off the vapor flow between the fuel tank and the canister. Thus, based on a fuel level 202 relative to vapor space 104 in the fuel tank, the vent valve may be open or closed. For example, FLVV 108 may be normally open allowing fuel tank overfilling to be prevented. During fuel tank refilling, when a fuel level 202 is raised, FLVV 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel system canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. Fuel system canister 22 may include a buffer or load port 241 to which conduit 31 is coupled. When purging conditions are met, such as when the canister is saturated, vapors stored in fuel system canister 22 may be purged to engine intake 23, specifically intake manifold 43, via purge line 28 by opening canister purge valve 112. While a single canister 22 is shown, it will be appreciated that fuel system 18 may include any number of canisters.

Canister 22 further includes a vent 27 (herein also referred to as a fresh air line) for routing gases out of the canister 22 to the atmosphere when storing, or trapping, fuel vapors from fuel tank 44. Vent 27 may also allow fresh air to be drawn into fuel system canister 22 when purging stored fuel vapors to engine intake 23 via purge line 28 and canister purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapors after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere.

As such, hybrid vehicle system 9 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, in some embodiments, a fuel tank isolation valve (FTIV) 116 may be optionally included in conduit 31 such that fuel tank 44 is coupled to canister 22 via FTIV 116. When included, the isolation valve may be kept closed during engine operation so as to limit the amount of diurnal vapors directed to canister 22 from fuel tank 44. During refueling operations, and selected purging conditions, the isolation valve may be temporarily opened to direct fuel vapors from the fuel tank 44 to canister 22. By opening the valve when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and canister 22, in alternate embodiments, the pressure sensor may be directly coupled to fuel tank 44.

Fuel vapors released from canister 22 during a purging operation may be directed into engine intake manifold 43 via purge line 28. The flow of vapors along purge line 28 may be regulated by canister purge valve 112, coupled between the fuel system canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold airflow (MAF) may be obtained from MAF sensor 118 coupled to intake manifold 43, and communicated with controller 12. Alternatively, MAF may be inferred from alternate engine operating conditions, such as mass air pressure (MAP), as measured by a MAP sensor 122 coupled to the intake manifold.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 and FTIV 116 to direct refueling and diurnal vapors into canister 22 while preventing fuel vapors from being directed into the intake manifold.

As another example, the fuel system may be operated in a refueling mode (e.g., when fuel tank refueling is requested by a vehicle operator), wherein the controller 12 may adjust the valves to depressurize the fuel tank before enabling fuel to be added therein. Therein the controller 12 may close canister vent valve (CVV) 114 and open each of canister purge valve 112 and FTIV 116 to direct excess fuel tank pressure/vacuum into the intake manifold via the canister.

As yet another example, the fuel system may be operated in a canister purging mode (e.g., after an emission control device light-off temperature has been attained and with the engine running), wherein the controller 12 may open canister purge valve 112, canister vent valve 114, and close FTIV 116. By closing the FTIV, the canister can be purged more efficiently during the limited engine-on time that is available in a hybrid vehicle. During this mode, vacuum generated by the intake manifold of the operating engine may be used to draw fresh air through vent 27 and through fuel system canister 22 to purge the stored fuel vapors into intake manifold 43. In this mode, the purged fuel vapors from the canister are combusted in the engine. The purging may be continued until the stored fuel vapors amount in the canister is below a threshold or until the engine is deactivated and an electric mode of vehicle operation is resumed. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister. In another embodiment, at an appropriate time after key off, a controller may "wake up" and determine the current load present in a fuel system canister based on inputs from sensors. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). In another example, the fuel system canister load may be based on the number and duration of refueling events that have occurred following a previous canister purging event. Based on the canister load, and further based on engine operating conditions, such as engine speed-load conditions, a purge flow rate may be determined.

Vehicle system 9 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAF sensor 118, and exhaust pressure sensor 129. Other sensors such as additional pressure, temperature, air/fuel ratio, and composition sensors may be coupled to various locations in the vehicle system 9. As another example, the actuators may include fuel injector 66, canister purge valve 112, canister vent valve 114, FTIV 116, and throttle 64. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 4-5.

FIG. 3 shows a schematic depiction of an internal combustion engine 10. Engine 10 comprises a plurality of cylinders, one cylinder 30 of which is shown in FIG. 3, controlled by electronic controller 12. Cylinder 30 (also known as combustion chamber 30) includes cylinder walls 33 with piston 36 positioned therein and connected to crankshaft 340. Combustion chamber 30 is shown communicating with intake manifold 43 and exhaust manifold 49 via intake valve 52 and exhaust valve 54 respectively. Each intake and exhaust valve may be operated by an intake cam 51 and an exhaust cam 53. Alternatively or additionally, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown arranged in intake manifold 43 in a configuration that provides what is known as port injection of fuel into the intake port. Additionally or alternatively, fuel may be injected directly into combustion chamber 30, which is known to those skilled in the art as direct injection. Further still, cylinder 30 may include each of a port injector and a direct injector such that at a portion of fuel is delivered via port injection while a remaining portion of fuel is delivered via direct injection. Fuel injector 66 delivers liquid fuel in proportion to the pulse width of signal FPW from controller 12. Fuel is delivered to fuel injector 66 by a fuel system 40 including a fuel tank, fuel pump, and fuel rail (not shown). Fuel injector 66 is supplied operating current from driver 68 which responds to controller 12. In addition, intake manifold 43 is shown with throttle 64 which adjusts a position of throttle plate 61 to control airflow from intake passage 42.

Distributorless ignition system 88 provides an ignition spark to combustion chamber 30 via spark plug 91 in response to controller 12. However, in other examples the ignition system 88 may not be included in the engine 10 and compression ignition may be utilized. Exhaust gas sensor 126 is shown coupled to exhaust manifold 49 upstream of emission control device 70. Emission control device 70 can include multiple catalyst bricks, in one example. In another example, multiple emission control devices, each with multiple bricks, can be used. Emission control device 70 can also be a three-way type catalyst in one example.

A HC trap 24 is included in the air intake path downstream of throttle 64 and upstream of the intake valve 52. HC trap 24 may include a suitable adsorbent, e.g., activated carbon, to adsorb fuel vapors in the engine intake. e.g., fuel puddles leaked from port fuel injectors and/or unburned fuel collected in the intake, in order to further reduce emissions. HC trap 24 may be periodically purged as described in more detail below. The intake passage may also include a purge line 28 for receiving fuel vapors purged from a fuel system canister (see canister 22 of FIG. 2).

Controller 12 is shown in FIG. 3 as a conventional microcomputer including: microprocessor unit 302, input/output ports 304, read-only memory 306, random access memory 308, keep alive memory 310, and a conventional data bus. Controller 12 is shown receiving various signals from sensors coupled to engine 10, in addition to those signals previously discussed, including: engine coolant temperature (ECT) from temperature sensor 312 coupled to cooling sleeve 314; a position sensor 134 coupled to an accelerator pedal 132 for sensing accelerator position adjusted by vehicle operator 130; a knock sensor for determining ignition of end gases (not shown); a measurement of engine manifold pressure (MAP) from pressure sensor 122 coupled to intake manifold 43; an engine position sensor 318 from a Hall effect sensor sensing crankshaft 340 position; a measurement of air mass entering the engine from sensor 118; and a measurement of throttle position from sensor 58. Barometric pressure may also be sensed (sensor not shown) for processing by controller 12. In one example, engine position sensor 318 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof as elaborated in the description for FIG. 1. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 43, and piston 36 moves to the bottom of the cylinder so as to increase the volume within combustion chamber 230. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 91, resulting in combustion. Additionally or alternatively compression may be used to ignite the air/fuel mixture. During the expansion stroke, the expanding gases push piston 36 back to BDC. Crankshaft 340 converts piston movement into a rotational torque of the rotary shaft. Finally, during the exhaust stroke, the exhaust valve 54 opens to release the combusted air-fuel mixture to exhaust manifold 49 and the piston returns to TDC. Note that the above is described merely as an example, and that intake and exhaust valve opening and/or closing timings may vary, such as to provide positive or negative valve overlap, late intake valve closing, or various other examples.

In this way, the systems of FIGS. 1-3 enable a method for selectively purging fuel vapors from an AIS HC trap into the fuel system canister by generating an intake airflow across the trap during vehicle motion under engine-off conditions.

Now turning to FIG. 4, an example routine 400 is shown for opportunistically purging an air intake system hydrocarbon (AIS HC) trap during vehicle travel with an engine shutdown to rest. An intake throttle is opened to generate a vehicle motion induced airflow in the direction of the HC trap and the fuel system. The AIS HC trap is then purged, via the canister purge valve (CPV), into the fuel system canister of a hybrid vehicle system.

At 402, the routine includes estimating and/or measuring vehicle operating conditions. These may include, for example, operator torque demand, battery state of charge, engine temperature, fuel tank fill level, ambient conditions (e.g., ambient temperature, barometric pressure, and ambient humidity), etc. At 404, based on the determined vehicle operating conditions, a vehicle mode of operation may be determined. For example, it may be determined if the vehicle is to be propelled using motor torque from a system motor and/or energy storage device, using engine torque from a combustion engine of the system, or a combination of motor torque and engine torque. For example, at higher loads or higher vehicle speed conditions, the vehicle may be propelled using engine torque only, or a combination of engine and motor torque while at lower loads or lower vehicle speeds, the vehicle may be propelled using motor torque only.

At 406, it may be confirmed if the vehicle is travelling in an engine-off or electric mode. For example, the engine may be turned off at low load or low vehicle speed conditions and the vehicle may be propelled using motor torque only. The engine being turned off includes the engine being shutdown and maintained at rest.

If engine-on conditions are present, then at 408 the routine involves performing a purging routine if purging conditions are met. For example, the routine includes using engine intake vacuum for purging each of a fuel system canister coupled to a fuel tank and a HC trap coupled to an engine air induction system, as described later in FIG. 5.

If the vehicle is travelling in an electric mode, then at 410, the vehicle speed is estimated or measured to determine whether it is above a threshold speed. In one example, the threshold speed is based on an airflow generated by vehicle motion at the vehicle speed. Thus, it may be confirmed that the vehicle speed is high enough to generate sufficient airflow in the engine intake. In alternate examples, instead of, or in addition to, assessing the vehicle speed, a vehicle motion induced intake airflow level may be measured or estimated (e.g., via a MAF sensor), and compared to a threshold airflow.

At 414, it may be determined if a fuel system canister load, e.g., an amount of fuel vapors stored in the fuel system canister, is less than a threshold load. For example, it may be determined if the fuel system canister is capable of accepting fuel vapors from the HC trap. An amount of fuel vapors stored in the fuel system canister may be measured based on one or more sensors in the emission control system or estimated based on the learned vapor amount/concentration at the end of a previous purging cycle. The amount of fuel vapors stored in the fuel system canister may be further estimated based on engine and vehicle operating conditions including a frequency of refueling events. For example, in HEV applications, the fuel tank may only be vented to the fuel system canister during refueling events and fuel tank over-pressurization conditions. Thus, the amount of fuel vapors stored in the canister may be based on the number of and length of refueling events which have occurred since a last canister purging event.

If it is determined that the fuel system canister load is above the threshold, then at 416 it is determined that the fuel system canister is unable to accept further fuel vapors from the HC trap. Accordingly, HC trap purging via vehicle motion induced airflow is not performed. Further, at 419, the controller may wait for the next engine-on mode to perform a routine to purge the canister to the intake of the engine, as elaborated at FIG. 5.

If the canister load is below the threshold and the canister has reserve capacity to adsorb more fuel vapors, at 418, purging of the HC trap is enabled. Specifically, the intake throttle is fully opened to allow airflow generated via the vehicle motion to be directed into the intake manifold, in the direction of the HC trap. The increased airflow in the intake passage increases passive desorption of fuel vapors from the HC trap.

At 420, cylinder valves are closed (if not already closed) so as to reduce ingestion of desorbed fuel vapors into the engine during the engine shutdown condition. Closing cylinder valves includes closing cylinder intake and/or exhaust valves. In one example, cylinder valve closing is achieved by adjusting the position of a variable cam timing (VCT) device coupled to the cylinders to fully close at least one intake valve or one exhaust valve of each cylinder. For example, the VCT position may be adjusted so as to close the intake and exhaust valves of each engine cylinder.

In another example, closing cylinder valves includes operating a generator (e.g., starter motor/generator) to rotate the engine position from a position at rest to a position where at least an intake or an exhaust valve of each cylinder is fully closed. For example, during a shutdown, the engine may be spun to rest at a position that is suited for cranking and restarting quickly. As an example, the engine may be spun to a position where at least one cylinder is in a compression stroke. While this position may be suited for engine restartability, such a position may allow for ingestion of air and fuel vapors from the intake. Therefore, to ensure that the vehicle motion generated airflow moves from the intake path into the fuel system canister to allow for HC trap purging, the engine may be moved from the position at rest (that is suited for restart) to a position that is suited for blocking airflow to the cylinders. Once HC trap purging is completed (or when no further airflow is available for purging), the generator may be used to reposition the engine back to the original position for swift cranking and restart.

Next, at 422, the CPV is opened to allow for a purge path between the HC trap and the fuel system canister. With the throttle fully open and vehicle speed over a threshold, air flows through the intake system, and across the AIS HC trap, and then into the fuel system before being vented to the atmosphere. This motion-induced flow causes trapped vapors to be desorbed and transferred to the fuel system canister. The CPV is open only as long as the canister has the storage capacity for additional fuel vapors from the HC trap. Alternately, the CPV may be commanded closed when the vehicle speed drops below a threshold. Thus the duration of opening of the CPV depends on canister load and on vehicle speed. At 426, each of the canister load and AIS HC trap load measurement is updated and the routine ends. Specifically, an amount of HC fuel vapors unloaded from the HC trap and an amount of fuel vapors loaded into the canister during the engine-off condition is learned. For example, the controller may learn how many times the HC trap was purged with ram air, how much fuel vapor unloading was achieved on each ram air purge, and how much fuel vapor was transferred to the fuel system canister during each ram air purge. As elaborated with reference to FIG. 5, a controller may adjust a timing and/or duration of canister purging during a subsequent engine-on condition based on the updated canister load information. For example, as the HC load received during engine-off ram air purging of the HC trap increases, a duration of engine-on canister purging may be increased and/or canister purging may be initiated earlier during an engine-on event.

Returning to 410, if the vehicle speed is determined to be below the threshold speed, then at 412, one or more vehicle components may be operated to actively enhance the intake airflow. For example, the grille shutters may be opened, and/or a position of the grill shutters (or louvers) may be adjusted. As another example, an electric air compressor may be activated. This may include operating a motor coupled to the electric air compressor to increase airflow into the engine air intake passage. As still another example, a cooling fan may be turned on to actively increase airflow into the intake system. For example, at extremely low speed conditions, the controller may determine that the cooling fan needs to be activated along with the grille shutters being fully opened to allow for a significant airflow. The controller may also choose to operate the fan at a higher speed as the vehicle speed drops. In another example, if the vehicle speed is just below the threshold, only the fan may be operated leaving the grille shutters closed. In still another example, the engine may be rotated unfueled using a starter/generator to increase airflow into the intake, and through the HC trap and fuel system. For example, the engine may be spun at an engine speed based on a difference between current vehicle speed and the threshold vehicle speed to augment the flow of air into the intake manifold. For example, the engine is rotated at a higher speed when the difference between vehicle speed and threshold speed is larger. If the vehicle speed is just below its threshold, the engine may be spun at a lower speed. In this situation, once the airflow reaches a satisfactory flow, the engine may be stopped and placed in a position where at least one of either an intake or exhaust valve of each cylinder is closed.

While the depicted routine shows grille shutter assistance being used when vehicle speed is lower than the threshold load, in alternate examples, prior to activating any of the vehicle components that may enhance airflow through the intake, the controller may first confirm if the fuel system canister has reserve capacity to accept any fuel vapors from the HC trap. If the canister load is close to its threshold limit and cannot accept any more vapors, the controller may not actuate any of the components that improve air flow. Further, the routine may wait for an engine-on mode to purge the canister (as at 416).

In still further examples, prior to providing grille shutter assistance, the controller may estimate if the combination of vehicle speed and grille shutter assistance can provide sufficient airflow to purge the HC trap opportunistically. For example, if a difference between the vehicle speed and the threshold speed is smaller, grille shutter assistance may allow sufficient airflow to be generated in the intake. However, if the difference is larger, even with the grille shutters fully open, sufficient airflow may not be generated. In such a scenario, the controller may not use any grille shutter assistance even when the vehicle speed is lower than the threshold. The controller may also decide to not activate any vehicle components described above if the load of the HC trap is minimal and when a purging is deemed unnecessary.

In this way, vehicle motion induced airflow, or ram air, may be utilized to purge the AIS HC trap during engine-off conditions to reduce hydrocarbon breakthrough and evaporative emissions from the air intake. By opening an intake throttle whenever the vehicle speed increases beyond a threshold, airflow can be generated in the intake in a direction across the trap (and towards the fuel system), and the enhanced ram airflow across the trap may be used to opportunistically purge fuel vapors from the HC trap into a fuel system canister for storage.

Figure 5:
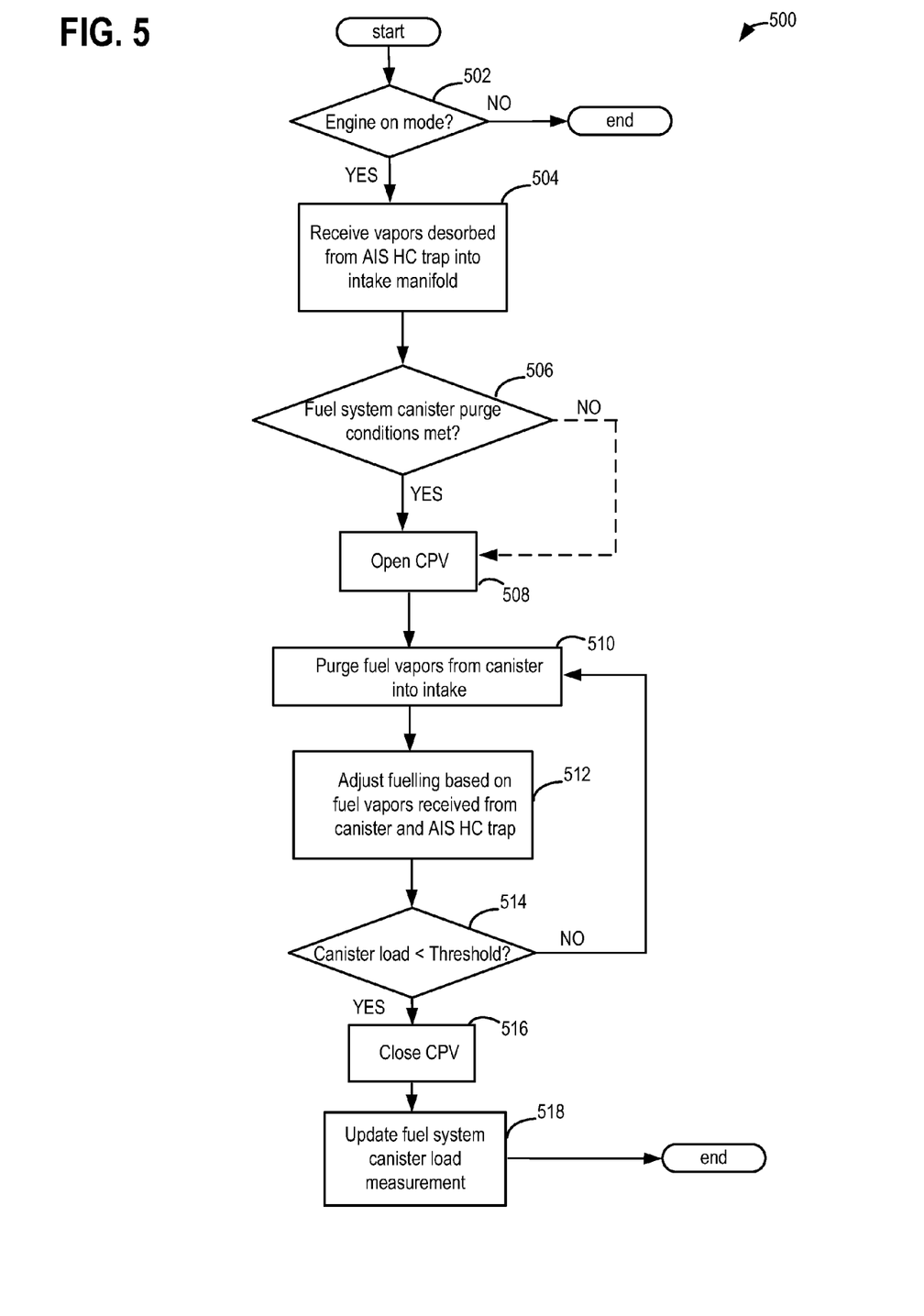
FIG. 5 is an example flowchart depicting a method for purging the air intake system HC trap and the fuel system canister during an engine-on mode.

Now turning to FIG. 5, an example routine 500 is shown illustrating the use of engine intake vacuum during engine-on conditions for purging the fuel system canister and HC trap. The HC trap is passively purged into the combustion chamber when the engine is operational in a hybrid vehicle system. Similarly, vacuum in the intake manifold can be used to drain the fuel system canister when the engine is running.

At 502, it may be confirmed if the vehicle is in engine-on mode. For example, the engine may be operational at high cruising speeds when the vehicle is travelling on a highway. If it is determined that the engine is off, the routine ends after 502.

If engine-on conditions are confirmed, then at 504, the engine intake receives fuel vapors passively desorbed from the AIS HC trap as air flows into the intake, through the trap and into the cylinders for combustion. In addition, intake manifold vacuum generated during engine operation is used to draw in fuel vapors from the HC trap. Based on the intake manifold vacuum level and/or the intake manifold airflow, the controller may also learn an amount of fuel vapors desorbed from the HC trap and received in the engine intake.

At 506, it may be verified if fuel system canister purge conditions are met. Canister purge conditions may be based on an amount of fuel vapors stored in the canister, a duration elapsed since a last purging operation, a distance travelled since a last purging operation, etc. In addition, canister purge conditions may be based on fuel vapors received in the canister from an AIS HC trap during engine-off conditions. As discussed with reference to FIG. 4, the canister may have received fuel vapors during the engine-off condition from ram air purging of the HC trap. A controller may update a canister load based on the HC load received from the HC trap as well as based on refueling and diurnal fuel vapors received in the canister from the fuel tank. For example, purge conditions may be confirmed if an amount of fuel vapors stored in the canister is greater than a threshold load. If the canister load is at or above the threshold load, the CPV is opened at 508 and canister fuel vapors are drawn by the vacuum in the intake manifold into the engine intake at 510.

At 512, engine fueling is adjusted based on an amount of fuel vapors ingested. Specifically, the amount of fuel injected into the engine cylinders is adjusted based on the quantity of fuel vapors received from each of the fuel system canister and the AIS HC trap. For example, fueling may be decreased as purged fuel vapor concentration increases so as to maintain combustion at stoichiometry.

At 514, it may be confirmed if the canister load is below a threshold load. If the canister load is above the threshold load, the routine returns to step 510 and continues to purge the canister. If the canister load is lower than the threshold load (e.g., the canister is fully purged), the CPV is closed at 516, the canister load is updated in the controller's memory at 518, and the routine ends. In alternate examples, even if the canister load is below the threshold load, during engine operation, canister purging may be opportunistically continued with the CPV open until the canister is fully purged. Herein, the limited engine operation time of a hybrid vehicle may be advantageously used to regenerate the canister whenever possible.

Example HC trap and canister purging operations in a hybrid electric vehicle, in accordance with the present disclosure, are shown at FIGS. 6-7. FIG. 6 shows an example purging operation without grill shutter assistance while FIG. 7 shows an example purging operation with grill shutter assistance.

At FIG. 6, map 600 depicts engine operation at plot 602, motor/generator operation at plot 604, canister purge valve (CPV) operation at plot 606, intake throttle positioning at plot 608, AIS HC trap load at 610, fuel system canister load at plot 612, and vehicle speed (Vs) at plot 614. Additionally, line 611 represents the threshold limit for the AIS HC trap load, line 613 is the threshold limit for fuel system canister load and line 615 corresponds to the vehicle speed threshold.

Prior to t1, the hybrid vehicle system may be operating in an engine-off mode (plot 602) with vehicle being propelled using motor torque (plot 604) and with the vehicle speed below a threshold 615 (plot 614). Also, prior to t1, diurnal fuel vapors may be collected and stored in a fuel system canister with a corresponding increase in canister load (plot 612). Similarly, prior to t1, the AIS HC trap may have adsorbed vapors from unburned fuel in the intake manifold (plot 610).

At t1, the vehicle speed (Vs) rises above threshold 615. As such, threshold 615 is a threshold indicative of a vehicle speed producing sufficient airflow that may be directed into the intake. At t1, in response to the increase in vehicle speed above threshold 615, opportunistic purging of the AIS HC trap may be enabled using airflow generated by vehicle motion at the current vehicle speed. Specifically, since the fuel system canister load is below its threshold 613 and has reserve space to adsorb more HC vapors, the intake throttle is fully opened (e.g., moved to a wide open throttle (WOT) position) to allow air to flow into the intake passage in the direction of the HC trap. At the same time, cylinder valves are fully closed (not shown) by adjusting either a VCT device coupled to cylinder valves or by spinning the engine unfueled to a position that blocks the ingestion of air into the engine cylinders. By closing the cylinder valves, fuel vapors desorbed from the trap are not ingested into the engine cylinders.

A CPV coupling the fuel system canister to the engine intake is also opened at t1 to allow air flowing through the HC trap to travel into the fuel system canister and selectively purge desorbed fuel vapors from the trap to the fuel system canister. Thus, between t1 and t2, the AIS HC trap load reduces (plot 610) while the load in the fuel system canister increases (plot 612) to near its threshold level.

It will be appreciated that while the above example does not show use of grill shutter assistance, in alternate examples, even though the vehicle speed is above the threshold speed, grille shutters may be opened and/or a cooling fan may be operated to enhance the airflow directed to the intake passage, thereby further improving HC trap purging.

At t2, the vehicle speed drops below its threshold. As a result of the drop in vehicle speed, airflow to the intake passage may drop and opportunistic purging of the HC trap may not be possible. Accordingly, at t2, while the vehicle is still in the engine-off mode, the intake throttle and the CPV are returned to a fully closed position.

At t3, operator torque demand may increase. To meet the higher torque demand and provide the higher vehicle speed, the engine is turned on. During engine operation, throttle opening may be adjusted based on intake air demand. Also at t3, the motor may be turned off (if motor torque is not required), as shown, or may continue to be operated (e.g., at a reduced speed) to provide a reduced motor torque demand. Once the engine is operational at t3, the AIS HC trap load starts to gradually decrease because any remaining adsorbed vapors are drained passively by intake airflow drawn during engine operation through the trap into the combustion chamber. In addition, intake manifold vacuum generated by the engine during combustion draws in fuel vapors from the HC trap.

At t4, when the engine has been running for some time, the canister purge valve is opened and the canister fuel vapors are rapidly purged into the engine intake with a corresponding drop in canister load. In the depicted example, CPV opening at t4 is triggered in response to canister load being at or above threshold 613. However, in alternate examples, the CPV may be opened as soon as engine operation is initiated (e.g., at t3) so as to purge the canister in the limited engine operation time of the hybrid vehicle, even if the canister load is below threshold 613. The CPV may be maintained open for a duration after t4 until the canister load has been sufficiently purged, after which the CPV may be closed.

At t5, due to a change in operating conditions, such as a drop in torque demand, the engine is turned off and the vehicle returns to electric mode again. Between t5 and t6, the vehicle speed remains below threshold 615 and therefore sufficient motion induced airflow is not available to purge the HC trap. Therefore, while the vehicle speed remains below threshold 615 with the vehicle in the electric mode, the CPV valve is maintained closed.

At t6, the vehicle is turned off (e.g., a vehicle key-off event) and a refueling event is initiated. Between t6 and t7 the vehicle is refueled and remains in a vehicle off state until t8. During refueling (between t6 and t7), the fuel system canister load rises steadily as refueling vapors are captured in the canister. During the engine-off condition, the AIS HC trap also adsorbs fuel vapors in the intake, such as those from intake port fuel puddles, leaked fuel, etc. Thus, by t8, when the vehicle is turned on again (e.g., a vehicle key-on event), the AIS HC trap and fuel system canister loads may be higher. In particular, the fuel system canister load may be at or close to threshold 613.

As the vehicle speed increases beyond threshold 615 at t9, even though sufficient airflow is available to purge the HC trap using motion induced airflow, the CPV remains closed since the fuel system canister does not have any reserve for accepting vapors from the HC trap. At t10, the engine is turned on because of an increase in torque demand. In response to the engine operation, as at t3-t5, the CPV is opened and both the HC trap (engine-on) and canister (CPV open) are purged to the engine intake.

It will be appreciated that while the depicted example shows the AIS HC trap releasing its contents during engine-off mode only when close to its threshold 611 and with CPV being open, in alternate examples, the HC trap can be purged opportunistically even when its load is low. Therefore, if the vehicle speed is high enough to permit high airflow and the fuel system canister has reserve to accept more HC vapors, the CPV can be opened to purge the HC trap without waiting for the trap load level to surpass a threshold.

It will also be appreciated that while the above example does not show the use of grille shutter assistance, in alternate examples, during conditions when vehicle is speed is high enough to enable airflow to be directed into the intake (e.g., at t1) to increase passive desorption of fuel vapors from the HC trap, one or more of the grille shutters, fan or e-compressor may be used to further enhance the intake airflow.

In FIG. 7, map 700 depicts the use of grille shutters to enhance intake airflow during engine-off conditions. Map 700 includes motor operation at plot 702, CPV operation at 704, throttle positioning at 706, intake airflow at 708, operation of grille shutters at 710, vehicle speed at 712, AIS HC trap load at 714 and fuel system canister load at 716. Threshold limit for intake airflow is shown at line 707, the threshold limit for vehicle speed is at line 713, threshold limit for AIS HC trap load is depicted by line 715 and threshold limit for the fuel system canister load is at line 717.

Prior to t1, the vehicle is operating in engine-off mode using only motor torque (plot 702). The vehicle speed is below a threshold and the AIS HC trap load is near threshold 715. At t1, the vehicle speed may be only slightly below threshold 713. With an intake throttle fully open at this vehicle speed, there may not be sufficient intake airflow to purge the HC trap. Therefore, to enhance the vehicle motion induced intake airflow, in addition to commanding intake throttle to be fully open at t1, the controller commands the grille shutters open at the front of the vehicle. Though not shown here, a cooling fan and/or a compressor motor may also be turned on to actively increase the airflow through the engine intake. The grille shutters can be activated to a fully open position or to a position between fully open and closed based on the airflow response.

At t2, in response to the grill shutter assistance, the airflow to the intake rises above threshold 707 and the controller determines there is sufficient airflow to enable HC trap purging. Accordingly, at t2, while the intake throttle is open, the CPV is opened to allow the HC trap to be purged into the fuel system canister. During the purging, cylinder valves are closed to reduce fuel vapor ingestion (not shown). After t2, while the CPV is open and the HC trap is being purged, the HC trap load decreases (plot 714) and the fuel system canister load correspondingly increases (plot 716). At t3, the vehicle speed may drop and even with grille shutter assistance, there may not be sufficient airflow for purging the HC trap. Accordingly, at t3, the CPV and the intake throttle may be closed and trap purging may be discontinued.

At t4, the vehicle speed may drop further below threshold 713. Therefore, at t4, opening the grille shutters, as shown at dashed segment 711, to enhance airflow to purge the AIS HC trap will not result in a significant increase in airflow as shown by dashed segment plot 709. Specifically, plot 709 shows that the airflow increases when the grille shutters are opened at t4 but does not cross the threshold 707, thus, rendering the opening of the grille shutters redundant. Therefore, at t4, HC trap purging is not performed opportunistically and the CPV and intake throttle are maintained closed.

In this way, a HC trap coupled to an air induction system can be purged even during conditions when an engine is not operating by using airflow generated using vehicle motion. As such, this reduces the need for engine intake vacuum for purging the HC trap. By opening an intake throttle when there is sufficient vehicle speed, vehicle motion induced airflow (or ram air) can be directed into the air induction system in a direction across the hydrocarbon trap, increasing passive desorption of fuel vapors from the trap. By concurrently opening a canister purge valve while closing cylinder valves, fuel vapors from the trap can be stored in a larger storage capacity fuel system canister while waiting for engine-on active purging conditions. By opportunistically cleaning the HC trap using ram air during hybrid vehicle operation in an electric mode whenever there is sufficient vehicle speed, the HC trap's ability to store intake fuel vapors during engine shutdown conditions is improved. As such, this reduces HC breakthrough from the HC trap while improving emissions performance of the hybrid vehicle.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle system, comprising, during vehicle propulsion with an engine at rest,
   increasing airflow through a hydrocarbon trap coupled in an engine intake; and
   purging fuel vapors from the trap to a fuel system canister, wherein increasing airflow through the hydrocarbon trap and purging fuel vapors from the trap includes when vehicle speed is above a threshold, fully opening an engine intake throttle and a canister purge valve.

2. The method of claim 1, wherein increasing airflow through the hydrocarbon trap and purging fuel vapors from the hydrocarbon trap further includes, when vehicle speed is below the threshold, one or more of opening a grill shutter, operating a radiator fan, spinning the engine unfueled via a generator, and spinning an intake compressor via an electric motor.

3. The method of claim 1, wherein the hydrocarbon trap has a smaller capacity and is coupled to the engine intake downstream of the intake throttle and upstream of an engine cylinder, and wherein the fuel system canister has a larger capacity and is coupled between a fuel tank and the engine intake.

4. The method of claim 1, further comprising, while fully opening the engine intake throttle and the canister purge valve, closing cylinder valves, wherein closing the cylinder valves includes adjusting a position of a variable cam timing device to fully close each of cylinder intake and exhaust valves.

5. The method of claim 4, wherein closing the cylinder valves includes rotating the engine from rest via a generator to a position where at least one intake valve or one exhaust valve of each engine cylinder is fully closed.

6. The method of claim 1, wherein purging includes selectively purging fuel vapors from the hydrocarbon trap to the canister responsive to a hydrocarbon load of the canister being below a threshold load.

7. The method of claim 6, wherein vehicle propulsion while an engine is at rest includes vehicle propulsion via motor torque, the method further comprising, during vehicle propulsion via engine torque, purging fuel vapors from the hydrocarbon trap to the engine intake.

8. A method for a hybrid vehicle comprising,
   while operating the hybrid vehicle in an engine-off mode and propelling the hybrid vehicle via motor torque,
   in response to vehicle speed exceeding a threshold,
      opening an intake throttle to increase airflow though a hydrocarbon trap coupled in an engine intake; and
      opening a purge valve while closing cylinder valves to purge fuel vapors desorbed from the hydrocarbon trap to a fuel system canister.

9. The method of claim 8, wherein opening the intake throttle includes opening the intake throttle to a wide open throttle position.

10. The method of claim 9, wherein closing cylinder valves includes one or more of commanding a VCT to a position where each of cylinder intake valves and cylinder exhaust valves are closed, and rotating an engine via a generator to a position where at least an intake valve or an exhaust valve of each engine cylinder is fully closed.

11. The method of claim 10, further comprising, in response to a drop in vehicle speed below the threshold, actively increasing airflow through the engine intake via one or more of opening a grill shutter, adjusting a position of grill shutter louvers, and operating a cooling system fan.

12. The method of claim 11, wherein actively increasing airflow through the engine intake further includes one or more of spinning the engine unfueled via the generator, and activating an electric air compressor, the engine spun at an engine speed based on the vehicle speed and a hydrocarbon load of the trap, the compressor spun at a rotational speed based on the vehicle speed and the hydrocarbon load of the trap.

13. The method of claim 8, wherein the purge valve is coupled between the engine intake and the canister, and wherein the hydrocarbon trap has a smaller capacity then the canister.

14. The method of claim 13, wherein a duration of opening the purge valve is based on a hydrocarbon load of the canister, the duration decreased as the canister load increases.

15. A hybrid vehicle system, comprising:
- an engine including an intake, the intake including a throttle and a hydrocarbon trap coupled downstream of the throttle;
- a generator coupled to a battery;
- a motor coupled to the battery;
- vehicle wheels propelled using torque from one or more of the engine and the motor;
- an engine cylinder including a port fuel injector, an intake valve, and an exhaust valve;
- a fuel system including a fuel tank coupled to a canister, the canister coupled to the engine intake via a purge valve;
- grill shutters coupled to a front end of the vehicle; and
- a controller with computer readable instructions stored in non-transitory memory for:
  - during a first engine-on condition, purging fuel vapors from each of the hydrocarbon trap and the canister to the engine intake; and
  - during a second engine-off condition, when vehicle speed is above a threshold, increasing airflow to the engine intake by opening the throttle and purging fuel vapors from the hydrocarbon trap into the canister, the second engine-off condition including propelling the hybrid vehicle system via the motor.

16. The hybrid vehicle system of claim 15, wherein the controller includes further instructions for, during a third engine-off condition with the hybrid vehicle system being propelled via the motor, when vehicle speed is below the threshold, increasing airflow to the engine intake by adjusting a position of the grill shutters and purging fuel vapors from the hydrocarbon trap to the canister.

17. The hybrid vehicle system of claim 16, further comprising a variable cam timing coupled to the intake valve and exhaust valve of the engine cylinder, wherein the controller includes further instructions for purging fuel vapors from the hydrocarbon trap to the canister during the second condition by opening the purge valve and adjusting a position of the variable cam timing to fully close each of the engine cylinder intake valve and exhaust valve.

18. The hybrid vehicle system of claim 17, wherein during each of the second and third engine-off conditions, a hydrocarbon load of the canister is below a threshold load.

19. The hybrid vehicle system of claim 18, wherein the controller includes further instructions for, during the second engine-off condition, further increasing airflow to the engine intake by adjusting a position of the grill shutters, and during the third engine-off condition, further increasing airflow to the engine intake by spinning the engine unfueled via the generator at an engine speed based on the hydrocarbon load of the hydrocarbon trap.

\* \* \* \* \*